(12) United States Patent
Fotland et al.

(10) Patent No.: US 10,200,572 B1
(45) Date of Patent: Feb. 5, 2019

(54) MOTION DETECTION

(71) Applicant: Amazon Technologies, Inc., Seattle, WA (US)

(72) Inventors: David Allen Fotland, San Jose, CA (US); Alexander Michael Fotland, San Jose, CA (US)

(73) Assignee: AMAZON TECHNOLOGIES, INC, Seattle, WA (US)

( * ) Notice: Subject to any disclaimer, the term of this patent is extended or adjusted under 35 U.S.C. 154(b) by 263 days.

(21) Appl. No.: 15/060,491

(22) Filed: Mar. 3, 2016

(51) Int. Cl.
*H04N 19/137* (2014.01)
*H04N 5/14* (2006.01)

(52) U.S. Cl.
CPC .................. *H04N 5/144* (2013.01)

(58) Field of Classification Search
CPC ...................................... H04N 5/144
USPC ............................ 348/699, 700; 375/240.16
See application file for complete search history.

(56) References Cited

U.S. PATENT DOCUMENTS

| | | | |
|---|---|---|---|
| 6,670,963 B2 * | 12/2003 | Osberger | G06K 9/00711 345/582 |
| 6,735,253 B1 * | 5/2004 | Chang | G11B 27/034 375/240.16 |
| 7,486,826 B2 | 2/2009 | Sung et al. | |
| 7,646,437 B1 * | 1/2010 | Dumitras | H04N 5/145 348/700 |
| 7,961,906 B2 | 6/2011 | Ruedin | |
| 8,000,393 B2 * | 8/2011 | Tanaka | H04N 19/139 375/240.16 |
| 8,593,572 B2 * | 11/2013 | Nix | H04N 5/144 345/204 |
| 8,675,736 B2 * | 3/2014 | Huang | H04N 19/139 348/699 |
| 9,342,871 B2 * | 5/2016 | Molgaard | G06T 5/50 |
| 2015/0077566 A1 | 3/2015 | Xiao et al. | |

OTHER PUBLICATIONS

Dalal, "Human Detection Using Oriented Histograms of Flow and Appearance," European Conference on Computer Vision, ECCV, Springer-Verlag, 3952, pp. 428-441, (May 2006).

* cited by examiner

*Primary Examiner* — Christopher G Findley
(74) *Attorney, Agent, or Firm* — K&L Gates LLP

(57) ABSTRACT

Various examples are directed to systems and methods for detection motion in video data. An image processor may receive video data. A first frame and a second frame may describe a plurality of pixel locations. The second frame may be positioned after the first frame in the frame sequence. The image processor may determine that a first subset of pixel locations from the plurality of pixel locations differ by less than a threshold amount between frames for at least a threshold number of frames in the frame sequence prior to the first frame. The image processor may identify from the first subset of pixel locations, a second subset of pixel locations that differ by more than the threshold amount between the first frame and the second frame and determine that a number of pixel locations in the second subset of pixel locations is greater than a motion pixel threshold.

20 Claims, 9 Drawing Sheets

MOTION DETECTION

BACKGROUND

Motion detection is used by many different kinds of devices to detect moving objects near the devices.

DETAILED DESCRIPTION

Figure 1:
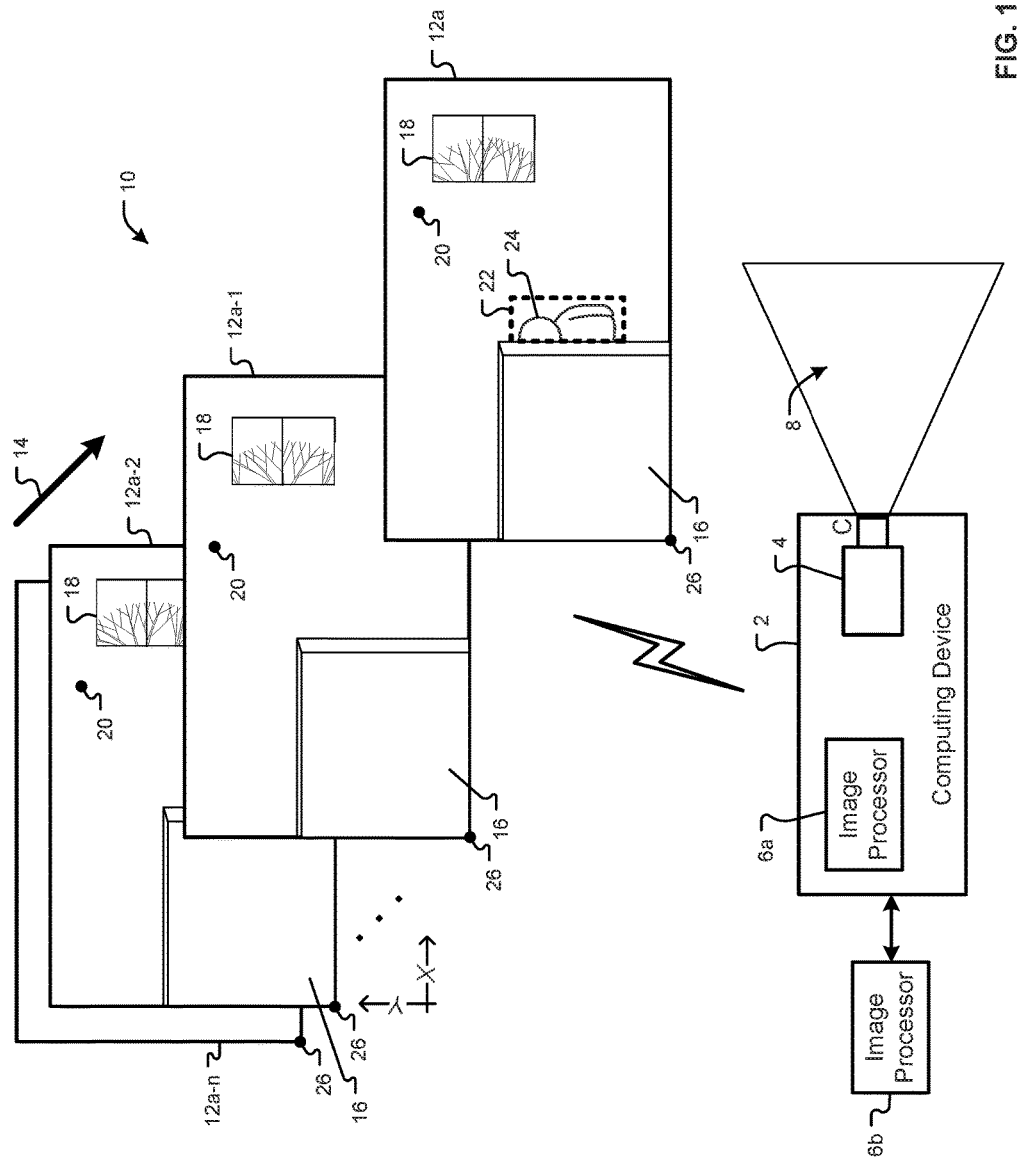
FIG. 1 is a diagram showing one example of an environment for motion detection.

In the following description, reference is made to the accompanying drawings, which illustrate several examples of the present disclosure. It is understood that other examples may be utilized and various operational changes may be made without departing from the spirit and scope of the present disclosure. The following detailed description is not to be taken in a limiting sense, and the scope of the embodiments of the present disclosure is defined only by the claims of the issued patent.

Various examples are directed to systems and methods for detecting motion in video data captured, for example, by a camera. An image processor may analyze the video data to detect the presence or absence of motion in the field-of-view of the camera. The video data may include frames described by a frame sequence. The frame sequence describes an order in which the frames were captured. In some examples, the image processor may determine the frame sequence considering time stamps associated with the frames. For example, when a frame is captured, the camera, image processor, or other device may create a time stamp for the frame describing a time when the frame was captured. The image processor may determine the frame sequence by referring to the associated time stamps. For example, a first frame with an associated time stamp indicating that it was captured prior to a second frame may be positioned in the frame sequence before the second frame.

The frames may be displayed according to the frame sequence to play back the video data. Each frame may include pixel values and spatial data. The spatial data may describe positions of the pixel values on a two-dimensional plane or grid. In some examples, the frames of the video data may describe a common set of pixel locations on the two-dimensional grid. Spatial data for a frame may link pixel values from the frame to pixel locations from the set of common pixel locations. Each frame may provide a distinct set of pixel values for the set of common pixel locations.

The camera for capturing the pixel values may comprise one or more grids of hardware elements, often called hardware pixels or just pixels. Pixels may be part of a charge coupled device (CCD) or other suitable image sensor in a camera. The camera may include optical components that focus light incident from a scene in the field-of-view of the camera onto the pixel grid. Each pixel value may be derived from the response of a pixel to the incident light. The pixels may be positioned to resemble a two-dimensional grid. The spatial arrangement of the pixels at the camera may correspond to a spatial arrangement of the pixel values in a given frame. In some examples, each pixel value in a frame is directly traceable to the output of a single hardware pixel. In other examples, however, a frame may be subjected to image processing operations that break the one-to-one correlation between pixels and pixel values. After image processing operations of this type are applied to a frame, the frame may comprise a plurality of pixel values and a spatial arrangement of the pixel values on the two-dimensional grid, although some or all of the pixel values may not be directly traceable to a particular hardware pixel. For example, an image processor may down-scale a frame, which, as described herein, reduces the total number of pixel locations and pixel values. Various other image processing operations that break the one-to-one correlation between pixels and pixel values include stitching one or more frames to form a panoramic frame, various filtering operations, etc.

Frames (e.g., the pixel values and spatial arrangement) depict a scene within the field-of-view of the camera at the time that the frame was captured. Motion in the field-of-view, then, may be reflected in differences between the frames of a frame sequence. For example, if a visible object, such as human, moves into the field-of-view of the camera between the capture of a first frame (frame N) and the capture of a second frame (frame N+1), then pixel values for at least some of the pixel locations will change between frame N and frame N+1. The image processor may detect the motion by analyzing these changes in the pixel values from frame-to-frame of the frame sequence.

In various examples, the image processor is programmed to analyze each frame of the video data, for example, as the frames are captured by the camera. When a new frame (frame N) is processed, the image processor may categorize the pixel locations at the frame N based on the corresponding pixel values at the frame N and at previous frames in the frame sequence. Pixel locations having pixel values that have not changed for a frame threshold number of frames prior to the frame N according to the frame sequence may be classified as static. Pixel locations with pixel values that have changed within the frame threshold number of frames prior to the frame N may be classified as dynamic. The image processor may also identify pixel locations that were classified as static at the prior frame in the frame sequence (e.g., frame N−1), and have changed between frame N−1 and frame N. These pixel locations, referred herein to as motion pixel locations, may indicate motion. The image processor may be programmed to determine the number of motion pixel locations in the frame N. In some examples, the image processor may detect motion in the frame N if the number of motion pixel locations exceeds a motion pixel location threshold. Also, in some examples, the image processor is programmed to generate a bounding box around the motion pixel locations. The image processor may also consider one or more properties of the bounding box to determine when motion is present. Properties of the bounding box that may be considered include, for example, an area of the bounding box or a perimeter of the bounding box.

In various examples, the image processor may be programmed to perform pre-processing on video data before detecting motion. For example, the image processor may receive raw frames and may down-scale the raw frames before detecting motion. Downscaling the raw frames may reduce the resolution of the frames (e.g., reduce the number of pixel locations and pixel values). This may reduce the processing resources required to execute motion detection and may also limit the susceptibility of the motion detection to noise. In some examples, pre-processing may also include modifying one or more control parameters of the camera. For example, if the camera includes an auto-white balance feature, the image processor may disable it. This may prevent the camera from making white-balance adjustments that could be mistaken for motion. Also, for example, if the camera includes an auto-focus feature, the image processor may disable it. This may prevent re-focus events from being mistaken for motion. In some examples, the image processor may also be programmed to set the exposure of the camera, for example, by increasing it to a maximum exposure. This may also reduce the susceptibility of the motion detection to noise, as described herein.

The image processor may be programmed to send a motion message when motion is detected at a frame. The motion message may be an instruction to execute a response to the motion and/or may be a message sent to another computing device or computing device component, which may trigger a response to the motion. Any suitable response may be taken including, for example, sending a message to a local or remote computing device, activating a display or other device, subjecting the frame at which motion was detected to additional processing, capturing additional frames (e.g., at a different resolution), etc. In various examples, the image processor may be or operate in conjunction with a security system. Example security system responses to a motion message may include, sounding an audible or visible alarm, sending a message to a police department or other authority, sending a message to a user's mobile device, capturing additional frames (e.g., higher resolution frames) of the field-of-view of the camera, etc. In various other examples, the image processor may be or operate in conjunction with a home management system. Detected motion may indicate that a user is at home or in a particular room. Accordingly, the response to the motion message may involve turning on a light, modifying a thermostat, opening or closing a blind, etc. Also, in some examples, the image processor may be or operate as a first-pass algorithm. The motion message may trigger the image processor or another image processor to perform more complex image recognition on the frame in which motion was detected. Also, for example, the motion message may trigger the image processor or another component to capture additional (e.g., higher resolution) frames to further investigate the camera field-of-view. In some examples, the image processor may be executed by or for a computing device having a sleep or energy conservation mode. When motion is detected, it may indicate that a user has approached the device. For example, a response to the motion message may include activating a display of the computing device, waking-up the computing device, or otherwise making the computing device ready for use.

FIG. 1 is a diagram showing one example of an environment 10 for motion detection. The environment 10 comprises a computing device 2 including a camera 4. The computing device 2 may be any suitable computing device, for example, as described herein below. The computing device 2 may include an image processor 6a or, in some examples, may be in communication with a remote image processor 6b. The camera 4 may capture video data including frames 12a, 12a-1, 12a-2, 12a-n. For example, the camera 4 may comprise one or more image sensors having a grid of hardware pixels, such as CCD sensors described herein. Frames may include pixel values for pixel locations depicting a scene present in a field-of-view 8 of the camera 4. A frame sequence 14 indicates the order in which the frames were captured. For example, of the frames shown in FIG. 1, frame 12a-n may have been captured first and frame 12a may have been captured last.

Each of the frames 12a, 12a-1, 12a-2, 12a-n comprises respective pluralities of pixel values. The frames 12a, 12a-1, 12a-n may also include spatial data (not shown in FIG. 1) that describes the pixel location of pixel values in the frames. Pixel locations may be described in any suitable two-dimensional coordinate system. In the example of FIG. 1, pixel locations may be described as Cartesian coordinates on an X-axis and a Y-axis. Coordinates for a pixel location may be expressed relative to an origin, which may be placed in any suitable position. In the example of FIG. 1, an origin 26 is positioned at the bottom left of the frames 12a, 12a-1, 12a-2, 12a-n. In various examples, the frames 12a, 12a-1, 12a-2, 12a-n may have the same resolution. For example, the frames 12a, 12a-1, 12a-2, 12a-n may have the same number of pixel values arranged in the same way. As a result, a given pixel location may correspond to a pixel value at each of the frames 12a, 12a-1, 12a-2, 12a-n. For example, a pixel location 20 is shown at frames 12a, 12a-1, and 12a-2. The pixel location 20 may be described by a pixel value from the frame 12a, by a different pixel value at the frame 12a-1, and by a third pixel value at frame 12a-2.

In the example of FIG. 1, the frames 12a, 12a-1, 12a-2, 12a-n depict a scene in the field-of-view 8 of the camera 4 including a wall 16, a window 18, and a person 24. The wall 16 and window 18 are depicted in the frames 12a, 12a-1, 12a-2. As shown, the depiction of the wall 16 does not appreciably change between the frames 12a, 12a-1, 12a-2. Accordingly, pixel values for the pixel locations depicting the wall 16 may not change between the frames 12a, 12a-1, 12a-2. The window 18 includes a tree which may tend to move or sway between frames. (For example, the wind may cause trees and other vegetation outside windows to move). As shown, the tree outside the window 18 changes from frame-to-frame. Accordingly, some pixel values at pixel locations corresponding to the window 18 may change between the frames 12a, 12a-1, 12a-2. The person 24 is not shown in frames 12a-2 and 12a-1. The person 24 moves from behind the wall 16 between the frame 12a-1 and the frame 12a. Accordingly, pixel values at the pixel locations where the person 24 will appear may be static in frames 12a-1 and 12a-2. The pixel values at those pixel locations in frame 12a change between frame 12a-1 and 12a where the person 24 is depicted.

To detect the motion, the image processor 6a, 6b may analyze the frames 12a, 12a-1, 12a-2, 12a-n. In some examples, the frames 12*a*, 12*a*-1, 12*a*-2, 12*a*-*n* may be analyzed in the order in which they are captured by the camera 4. To analyze a frame, such as 12*a*, the image processor 6*a*, 6*b*, may classify pixel locations at the frame 12*a*-1 as static, dynamic, or motion pixel locations. Static pixel locations may be pixel locations for which pixel values have not changed for a frame threshold number of frames prior to the considered frame 12*a* in the frame sequence. For example, in FIG. 1, a pixel location depicting to the wall 16 may be static at frame 12*a* if the pixel value for the pixel location has not changed for the frame threshold number of frames prior to frame 12*a* in the frame sequence 14. On the other hand, pixel locations depicting the tree outside the window 18 may not be static because as the tree moves from frame to frame, pixel values for those pixel locations change.

To identify motion, the image processor 6*a*, 6*b* may identify pixel locations that were static at the previous frame and have changed between the previous frame and the current frame. For example, the pixel locations to the right of the wall 16 may have been classified as static at the frame 12*a*-1 because pixel values for those pixel locations may not have changed for the frame threshold number of frames prior to frame 12*a*-1. When frame 12*a* is analyzed, however, the same pixel locations have changed. For example, the person 24 is depicted in frame 12*a*, but not in frame 12*a*-1. Accordingly, the pixel locations showing the person 24 may be classified as motion pixel locations at frame 12*a*. If the number of motion pixel locations at the frame 12*a* exceed the motion pixel threshold and/or the perimeter and/or area of the bounding box 22 exceeds a bounding box threshold, the image processor 6*a*, 6*b* may detect motion at the frame 12*a*.

Figure 2:
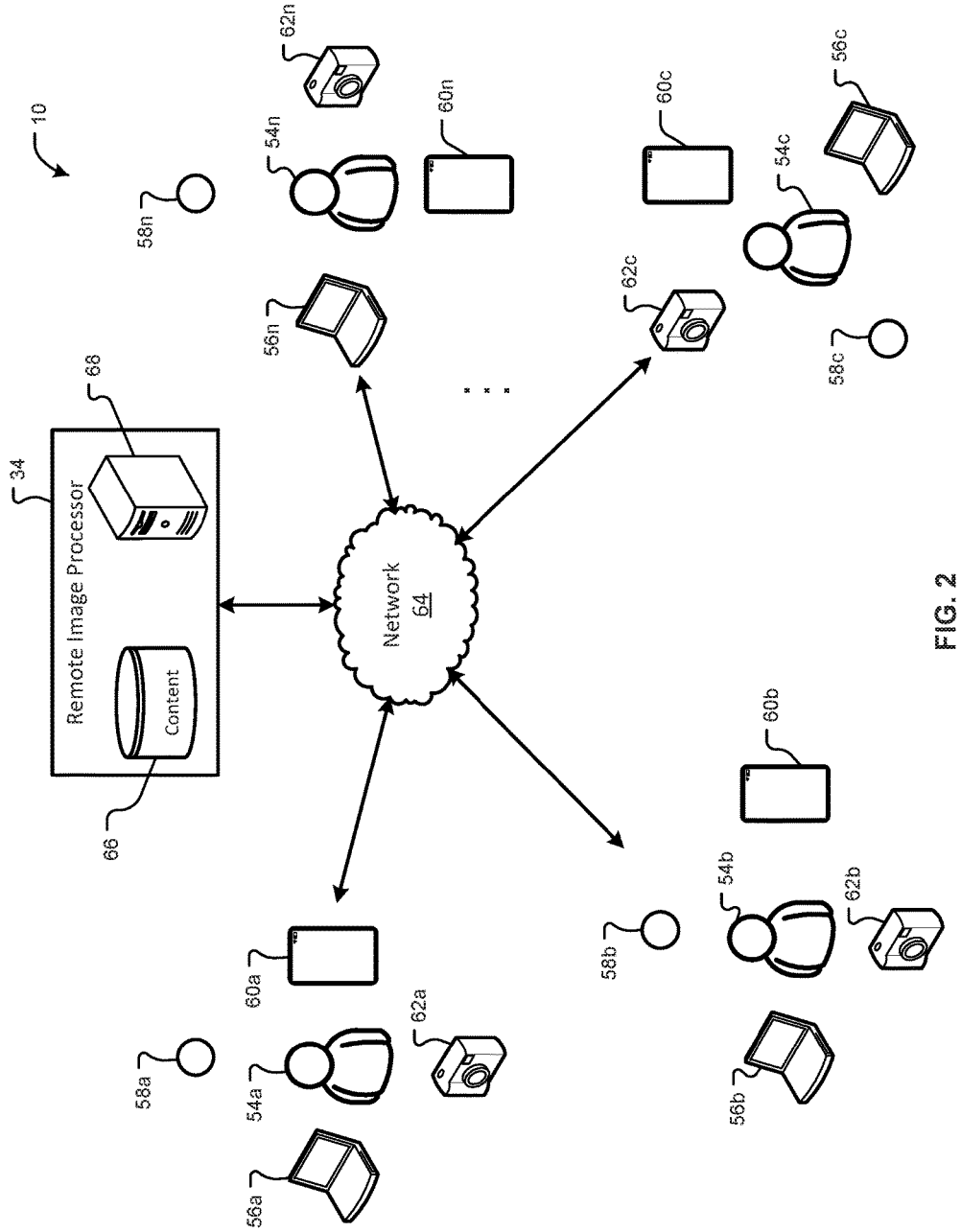
FIG. 2 is a diagram showing another example of the environment including additional components.

FIG. 2 is a diagram showing another example of the environment 10 including additional components. As shown in FIG. 2, the environment 10 comprises the remote image processor system 34 and users 54*a*, 54*b*, 54*c*, 54*n*. Each user 54*a*, 54*b*, 54*c*, 54*n* may use one or more computing devices such as, for example, panoramic cameras 58*a*, 58*b*, 58*c*, 58*n*, digital cameras 62*a*, 62*b*, 62*c*, 62*n*, mobile devices 60*a*, 60*b*, 60*c*, 60*n*, or other computing devices 56*a*, 56*b*, 56*c*, 56*n*. Although four users 54*a*, 54*b*, 54*c*, 54*n* are shown, any suitable number of users 54*a*, 54*b*, 54*c*, 54*n* may be part of the environment 10. Also, although each user 54*a*, 54*b*, 54*c*, 54*n* shown in FIG. 2 is associated with a panoramic camera 58*a*, 58*b*, 58*c*, 58*n*, a mobile device 60*a*, 60*b*, 60*c*, 60*n*, a digital camera 62*a*, 62*b*, 62*c*, 62*n*, and a computing device 56*a*, 56*b*, 56*c*, 56*n*, some users 54*a*, 54*b*, 54*c*, 54*n* may use more, fewer, or different types of devices than what is shown. The environment 10 may also comprise a remote image processor system 34, which also includes a computing device. The remote image processor system 34 may comprise one or more servers 68 and one or more data storage devices 66. For example, the data storage device 66 may store video data to be analyzed to detect motion as described herein.

Computing devices may be utilized to capture image frames either for singular images or as part or all of a video. Computing devices may also perform various processing on captured image frames. In some examples, one or more computing devices may detect foreground objects in one or more video frames, as described herein. Panoramic cameras 58*a*, 58*b*, 58*c*, 58*n* may include one or more image sensors and associated optics to capture panoramic frames (e.g., images and/or videos) as described herein. Panoramic cameras 58*a*, 58*b*, 58*c*, 58*n* may have a panoramic field-of-view larger than that of a standard camera. For example, panoramic cameras 58*a*, 58*b*, 58*c*, 58*n* may have a field-of-view of about 180° or greater. Some panoramic cameras 58*a*, 58*b*, 58*c*, 58*n* may have fields-of-view as large as 360° and/or 4π steradians, as described herein. In some examples, a panoramic camera 58*a*, 58*b*, 58*c*, 58*n* may comprise a single image sensor with lenses, mirrors or other optics allowing the single image sensor to receive electromagnetic radiation (e.g., light) from the panoramic field-of-view. In some examples, a panoramic camera 58*a*, 58*b*, 58*c*, 58*n* may comprise multiple image sensors (e.g., with overlapping fields-of-view). The panoramic camera 58*a*, 58*b*, 58*c*, 58*n* (or another component of the environment 10) may be configured to stitch frames from the respective image sensors into a single panoramic frame. In some examples, a panoramic camera 58*a*, 58*b*, 58*c*, 58*n* may be configured to communicate with other components of the environment 10 utilizing, for example, a wired or wireless connection. For example, a panoramic camera 58*a*, 58*b*, 58*c*, 58*n* may upload a frame or frames to a companion user device, such as, a mobile device 60*a*, 60*b*, 60*c*, 60*n* or computing device 56*a*, 56*b*, 56*c*, 56*n* via a wired connection, such as Universal Serial Bus (USB), or wireless connection, such as near field communication (NFC) or Bluetooth. In some examples, a panoramic camera 58*a*, 58*b*, 58*c*, 58*n* may be configured to upload frames directly to the remote image processor system 34, for example, via the network 64.

Digital cameras 62*a*, 62*b*, 62*c*, 62*n* may comprise any suitable device with one or more image sensors to capture an image and/or video. In some examples, digital cameras 62*a*, 62*b*, 62*c*, 62*n* may be configured to communicate with other components of the environment 10 utilizing, for example, a wired or wireless connection. For example, a digital camera 62*a*, 62*b*, 62*c*, 62*n* may upload images and/or videos to a mobile device 60*a*, 60*b*, 60*c*, 60*n* or computing device 56*a*, 56*b*, 56*c*, 56*n* via a wired connection, such as Universal Serial Bus (USB), or wireless connection, such as near field communication (NFC) or Bluetooth. In some examples, a digital camera 62*a*, 62*b*, 62*c*, 62*n* may be configured to upload images and/or video directly to a remote image processor system 34, for example, via the network 64. Also, in some examples, a digital camera 62*a*, 62*b*, 62*c*, 62*n* may comprise a processor and/or other components to implement video compression, as described herein. Digital cameras 62*a*, 62*b*, 62*c*, 62*n* may have one or more than one image sensor and may have a standard or panoramic field-of-view.

A mobile device 60*a*, 60*b*, 60*c*, 60*n* may be any suitable type of computing device comprising a processor and data storage. In some examples, a mobile device 60*a*, 60*b*, 60*c*, 60*n* may be configured to receive frames captured by a panoramic camera 58*a*, 58*b*, 58*c*, 58*n* or digital camera 62*a*, 62*b*, 62*c*, 62*n* and transfer the frames to the remote image processor system 34. In some examples, a mobile device 60*a*, 60*b*, 60*c*, 60*n* may execute a remote image processor for enhancing frames and/or videos received, for example, from a panoramic camera 58*a*, 58*b*, 58*c*, 58*n* or digital camera 62*a*, 62*b*, 62*c*, 62*n*. Also, in some examples, a mobile device 60*a*, 60*b*, 60*c*, 60*n* may comprise one or more image sensors and associated optics for capturing video and either uploading the video to the remote image processor system 34 or performing motion detection, as described herein. In some examples, a mobile device 60*a*, 60*b*, 60*c*, 60*n* may be configured to communicate on a cellular or other telephone network in addition or instead of the network 64.

Other computing devices 56*a*, 56*b*, 56*c*, 56*n* may be any suitable type of computing device comprising a processor and data storage including, for example, a laptop computer, a desktop computer, etc. In some examples, a computing device 56a, 56b, 56c, 56n may be configured to receive image frames captured by a panoramic camera 58a, 58b, 58c, 58n or digital camera 62a, 62b, 62c, 62n and transfer the image frames to the remote image processor system 34. In some examples, a computing device 56a, 56b, 56c, 56n may be configured to execute an image processor for processing videos received, for example, from a panoramic camera 58a, 58b, 58c, 58n or digital camera 62a, 62b, 62c, 62n. Also, in some examples, a computing device 56a, 56b, 56c, 56n may comprise one or more image sensors and associated optics for capturing video and either uploading the video to the remote image processor system 34 or performing compression locally.

The remote image processor system 34 may perform various processing on image frames received from users 54a, 54b, 54c, 54n (e.g., user devices associated with the user). For example, the image processor system 34 may identify objects or other content-of-interest in frames received from users 54a, 54b, 54c, 54n. This may allow user devices, such as the panoramic cameras 58a, 58b, 58c, 58n, to turn off one or more image sensors, as described herein. In some examples, the remote image processor system 34 may perform other processing on frames received from the users 54a, 54b, 54c, 54n. For example, the remote image processor system 34 may perform various enhancements to frames received from the user devices.

The remote image processor system 34 may comprise one or more data stores 66 and one or more servers 68. The data store 66 may store video data received from the various computing devices. The various components 68, 66 of the remote image processor system 34 may be at a common geographic location and/or may be distributed across multiple geographic locations. For example, the remote image processor system 34 may be implemented in whole or in part as a cloud or Software as a Service (SaaS) system. In some examples, the remote image processor system 34 may communicate with multiple different users 54a, 54b, 54c, 54n (e.g., via their associated cameras, computing devices, or other devices). The various components of the environment 10 may be in communication with one another via a network 64. The network 64 may be and/or comprise any suitable wired or wireless network configured according to any suitable architecture or protocol. In some examples, the network 64 may comprise the Internet.

Figure 3:
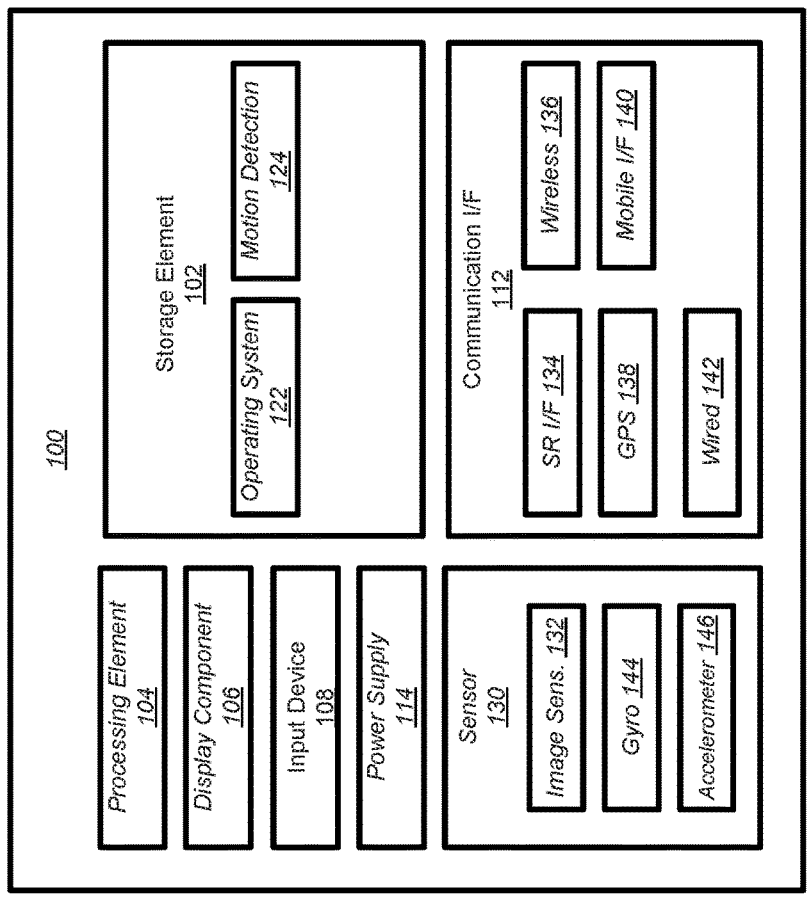
FIG. 3 is a block diagram showing an example architecture of a computing device.

FIG. 3 is a block diagram showing an example architecture 100 of a computing device. It will be appreciated that not all computing devices will include all of the components of the architecture 100 and some computing devices may include additional components not shown in the architecture 100. The architecture 100 may include one or more processing elements 104 for executing instructions and retrieving data stored in a storage element 102. The processing element 104 may comprise at least one processor. Any suitable processor or processors may be used. For example, the processing element 104 may comprise one or more digital signal processors (DSPs). The storage element 102 can include one or more different types of memory, data storage or computer readable storage media devoted to different purposes within the architecture 100. For example, the storage element 102 may comprise flash memory, random access memory, disk-based storage, etc. Different portions of the storage element 102, for example, may be used for program instructions for execution by the processing element 104, storage of frames or other digital works, and/or a removable storage for transferring data to other devices, etc. An operating system 122 may provide the user with an interface for operating the computing device and may facilitate communications and commands between applications executing on the architecture 100 and various hardware thereof. A motion detection utility 124 may compress binary masks, as described herein.

When implemented in some computing devices, the architecture 100 may also comprise a display component 106. The display component 106 may comprise one or more light emitting diodes (LEDs) or other suitable display lamps. Also, in some examples, the display component 106 may comprise, for example, one or more devices such as cathode ray tubes (CRTs), liquid crystal display (LCD) screens, gas plasma-based flat panel displays, LCD projectors, or other types of display devices, etc.

The architecture 100 may also include one or more input devices 108 operable to receive inputs from a user. The input devices 108 can include, for example, a push button, touch pad, touch screen, wheel, joystick, keyboard, mouse, trackball, keypad, light gun, game controller, or any other such device or element whereby a user can provide inputs to the architecture 100. These input devices 108 may be incorporated into the architecture 100 or operably coupled to the architecture 100 via wired or wireless interface. When the display component 106 includes a touch sensitive display, the input devices 108 can include a touch sensor that operates in conjunction with the display component 106 to permit users to interact with the image displayed by the display component 106 using touch inputs (e.g., with a finger or stylus). The architecture 100 may also include a power supply 114, such as a wired alternating current (AC) converter, a rechargeable battery operable to be recharged through conventional plug-in approaches, or through other approaches such as capacitive or inductive charging.

The architecture 100 may also include a communication interface 112, comprising one or more wired or wireless components operable to communicate with one or more other user devices and/or with the remote image processor system 34. For example, the communication interface 112 may comprise a wireless communication module 136 configured to communicate on a network, such as the network 64, according to any suitable wireless protocol, such as IEEE 802.11 or another suitable wireless local area network WLAN protocol. A short range interface 134 may be configured to communicate using one or more short range wireless protocols such as, for example, near field communications (NFC), Bluetooth, Bluetooth LE, etc. A mobile interface 140 may be configured to communicate utilizing a cellular or other mobile protocol. A Global Positioning System (GPS) module 138 may be in communication with one or more earth-orbiting satellites or other suitable position-determining systems to identify a position of the architecture 100. A wired communication module 142 may be configured to communicate according to the Universal Serial Bus (USB) protocol or any other suitable protocol.

The architecture 100 may also include one or more sensors 130 such as, for example, one or more image sensors and one or more motion sensors. Some examples of the architecture 100 may include multiple image sensors 132. In some examples, one or more image sensors 132 may capture video data to be analyzed for motion, as described herein. Motion sensors may include any sensors that sense motion of the architecture including, for example, gyroscopes 144 and accelerometers 146. The gyroscope 144 may be configured to generate a signal indicating rotational motion and/or changes in orientation of the architecture (e.g., a magnitude and/or direction of the motion or change in orientation). Any suitable gyroscope may be used including, for example, ring laser gyroscopes, fiber-optic gyroscopes, fluid gyroscopes, vibration gyroscopes, etc. The accelerometer 146 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 138 may be utilized as a motion sensor. For example, changes in the position of the architecture 100, as determined by the GPS interface 138, may indicate the motion of the GPS interface 138. Other types of motion sensors that may be included in the architecture 100 include digital compass sensors, other location sensors (e.g., utilizing beacon signals or time stamps to determine a current or past location of the architecture), time-of-flight or other depth sensors, etc. In some examples, an image sensor may also be a motion sensor.

Figure 4:
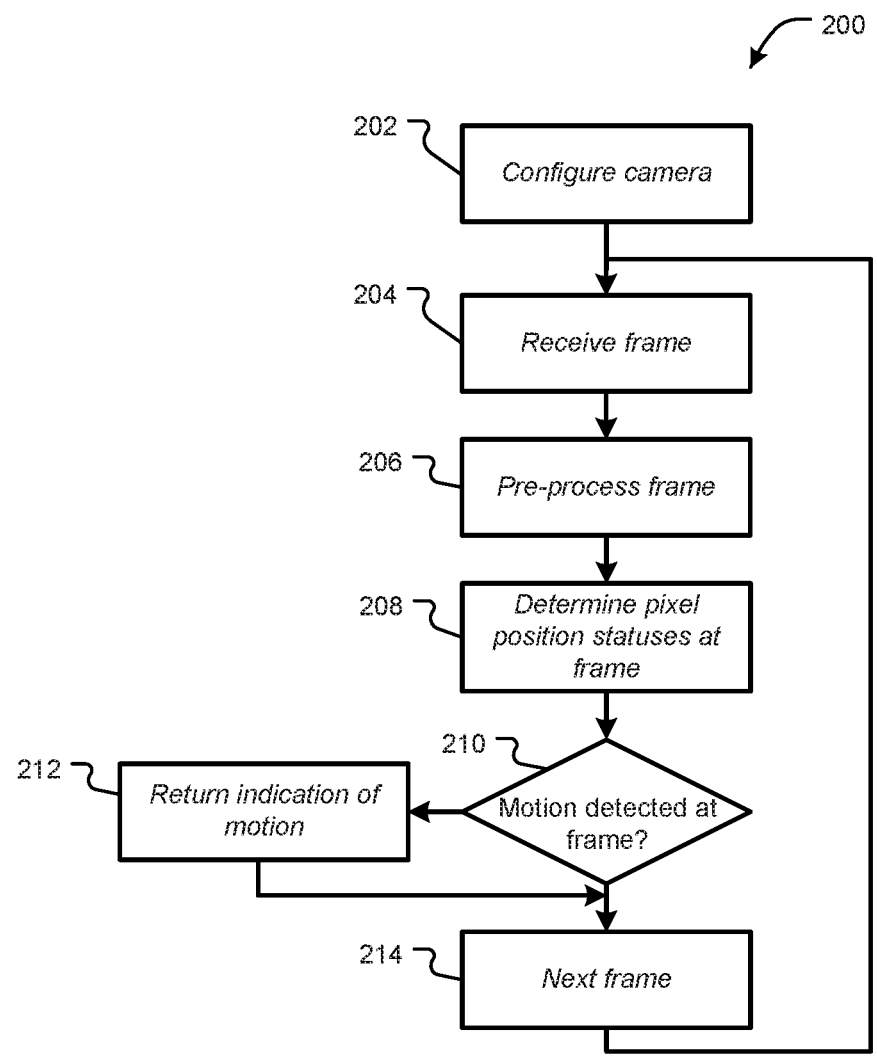
FIG. 4 is a flow chart showing one example of a process flow that may be executed by an image processor to detect motion in video data.

FIG. 4 is a flow chart showing one example of a process flow 200 that may be executed by an image processor to detect motion in video data. At action 202, the image processor may optionally configure the camera for motion detection. Configuring the camera for motion detection may comprise various actions, including, for example, setting a resolution of the camera, setting a frame rate of the camera, setting a white balance of the camera, setting an exposure of the camera, etc. Examples of configuring a camera for motion detection are described in additional detail with reference to FIG. 5. Camera configuration, such as action 202 may be performed by the device capturing video data before the video data is captured. For example, when the image processor is executed at the computing device that is also capturing the video data frames during the motion detection, then the image processor may perform camera configuration at action 202. In some examples, however, motion detection may be performed without configuring the camera. For example, motion detection may be performed on previously captured video data stored at a data storage element, such as elements 102 or 66 described above. When the video data is already captured, it may not be necessary to configure the camera before performing motion detection. Also, in some examples, camera configuration at action 202 may be omitted altogether.

At action 204, the image processor may receive a frame. The frame may be received from a camera or image sensor. In some examples, the frame may be received from a data storage element of the computing device implementing the image processor. Also, in some examples, the frame may be received from another computing device. For example, the remote image processor 34 may receive frames from other computing devices in the environment 10. The frame received at action 202 is referred to herein as the considered frame. At action 206, the image processor may pre-process the considered frame. Pre-processing may include various actions such as, for example, downscaling the frame to reduce the number of pixel locations and pixel values in the frame. Examples of pre-processing operations are described in additional detail with reference to FIG. 6. In some examples, pre-processing may include shifting the frame for camera motion. For example, as the camera moves between capturing frames of a frame sequence, pixel locations may shift. Accordingly, the image processor may be programmed to sense motion of the camera (e.g., utilizing a gyroscope 144) and shift the pixel locations in the considered frame to correspond to pixel locations in prior frames.

At action 208, the image processor may determine pixel location statuses at the considered frame. For example, a pixel location may be classified as static if its pixel value at the considered frame is not changed from its pixel value at the previous frame in the frame sequence and has not changed for a frame threshold number of frames prior to the considered frame. A pixel location may be classified as dynamic if it changes relative to the previous frame or if it has changed within the frame threshold number of frames prior to the considered frame. A pixel location may be classified as a motion pixel location if it was classified as static at the previous frame and has changed between the previous frame and the current frame. Examples for classifying pixel locations in a frame are described in additional detail with reference to FIG. 7.

At action 210, the image processor may determine if motion is detected at the considered frame. In some examples, motion is detected if the number of motion pixel locations at the frame exceeds a motion pixel location threshold. In some examples, other criteria may be used in addition to or instead of a motion position threshold. For example, the image processor may generate a bounding box containing some or all of the motion pixel locations in the considered frame. If the perimeter and/or area of the bounding box exceeds a threshold, then the image processor may detect motion at the considered frame. Examples for determining if motion is detected at the considered frame are described in additional detail with reference to FIGS. 10 and 11.

If motion is detected at action 210, the image processor may return an indication of motion in the considered frame at action 212. The indication of motion may be, for example, a motion message that may trigger a motion response from a computing device in the environment 10. The motion response may include, for example, sounding an alarm, activating the computing device, etc. After sending the motion message, the image processor may proceed to the next frame in the frame sequence at action 214 and then process the next frame, for example, beginning at action 204. If no motion is detected at action 210, the image processor may also proceed to the next frame in the frame sequence at action 214. In some examples, the response triggered by motion detection at a considered frame may cause changes to the next frame or frames captured that could lead to a false positive. For example, the motion message may cause a computing device to wake-up or turn on its display. If the action (e.g., turning on a display) is in the field-of-view of the camera, then it might cause pixel values at some pixel locations to change, which could cause the image processor to erroneously detect motion at the subsequent frames. In some examples, in order to address this, the image processor may be programmed to discard a predetermined number of frames after motion is detected. Motion detection may resume after the predetermined number of frames is captured and discarded.

Figure 5:
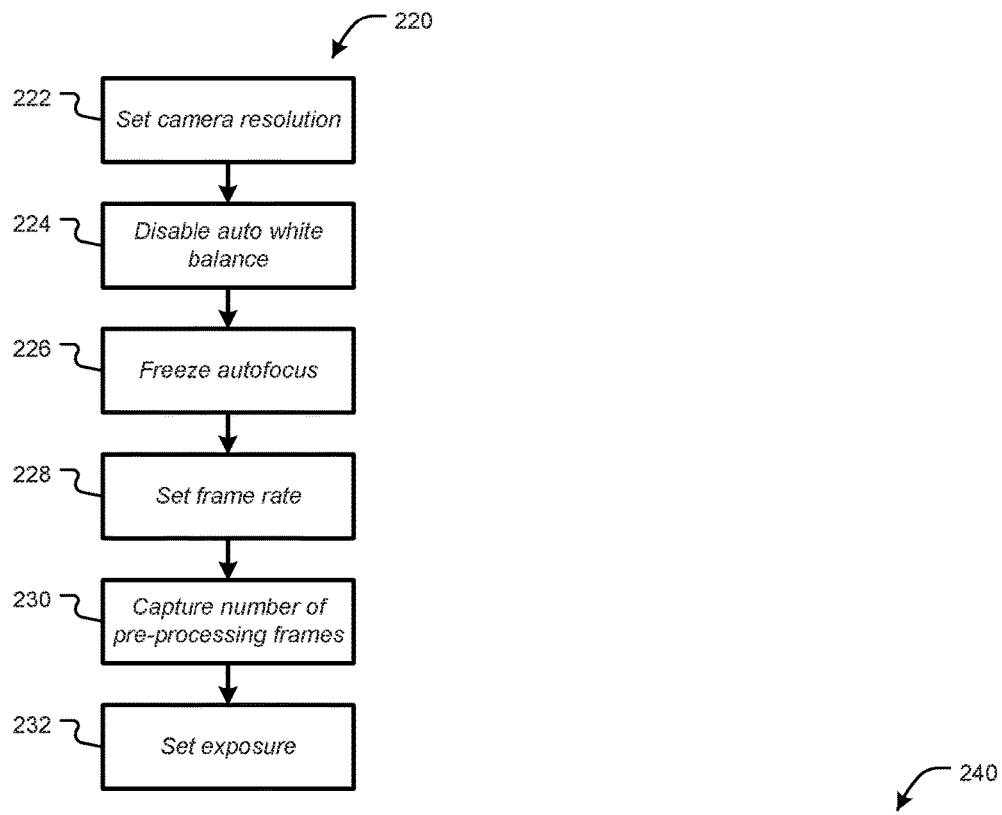
FIG. 5 is a flow chart showing one example of a process flow that may be executed to configure a camera for capturing video data for motion detection.

FIG. 5 is a flow chart showing one example of a process flow 220 that may be executed to configure a camera for capturing video data for motion detection. For example, the process flow 220 may be executed by an image processor at action 202 of the process flow 200. Although the process flow 220 is described herein as being executed by an image processor, in some examples, the process flow 220 may be executed by another computing device of the environment 10. For example, process flow 220 may be executed by a computing device before capturing video data that may be later analyzed by an image processor to detect motion.

At action 222, the image processor may optionally set a resolution of the camera. For example, some cameras may support multiple resolutions. Some resolutions (e.g., lower resolutions with fewer pixel locations and pixel values per frame) may be referred to as preview sizes. The image processor may select the supported camera resolution with the smallest aspect ratio that is suitable for motion detection. In some examples, the selected aspect ratio may have a width of at least sixty (60) pixel locations.

At action 224, the image processor may optionally disable an auto white balance feature of the camera. For example, some cameras may support an auto white balance feature that automatically adjusts pixel values captured by the camera so as to maintain a consistent ratio of lightly-colored pixel values to darkly-colored pixel values. This may allow the camera to capture consistent frames in differing lighting conditions. If an auto white balance occurs during motion detection, however, it may cause previously-static pixel locations to be classified as motion pixel locations, causing a false detection of motion. Accordingly, the image processor may disable an auto white balance feature if the camera has one.

At action 226, the image processor may freeze a focus of the camera, for example, at a hyperfocal plane. Some cameras may have an auto-focus feature that automatically modifies the focus of the camera in response to changes in the cameras field-of-view. If an auto-focus event occurs during motion detection, however, it may cause previously-static pixel locations to be classified as motion pixel locations, again causing false detection of motion. Accordingly, the image processor may disable auto-focus if it is available. In some examples, the image processor may also set a static focus of the camera, for example, to a hyperfocal plane. A hyperfocal plane may be a distance from the camera at which the camera may be focused while keeping all objects in the field-of-view of the camera acceptably sharp or in-focus. In some examples, the static focus may be set to a distance other than the hyperfocal plane. For example, the static focus may be set to a distance where motion is expected to occur. When the camera is used in a small room, for example, the static focus may be set to shorter distances from the camera. In some examples, the image processor may set a static-focus for the camera even if the camera does not have an auto-focus feature.

At action 228, the image processor may set a frame rate for the camera. The frame rate may describe the rate at which the camera captures new frames. In some example, the frame rate may be set to a value lower than what would be typically used for live-action video. For example, the frame rate may be set between ten (10) and twenty (20) frames-per-second (fps). In some examples, the frame rate may be set to 15 fps. Utilizing a lower frame rate may make motion detection less susceptible to noise and also may reduce the energy consumed by the camera and the processing resources required for motion detection. In some examples, the frame rate may be set high enough to meet a latency requirement of the motion detection. For example, if the image processor is to respond to motion within a particular latency (e.g., 500 ms), then the lowest acceptable frame rate would be 2 fps.

At actions 230 and 232, the image processor may set an exposure for the camera. The exposure may describe the whiteness or brightness of the pixel values captured by the camera. In cameras with a mechanical shutter, exposure may be determined by the length of time that the shutter is open. In some cameras using Complementary Metal Oxide Semiconductor (CMOS) or other CCD sensors, exposure may describe a length of time after reset that the CCD is exposed to light incident from the field-of-view of the camera. For example, when a frame is to be captured, the camera may reset the CCD sensor. Subsequently, the camera may measure the charge on each pixel of the CCD sensor. The charge on each pixel may reflect the quantity and/or wavelength of light incident on the pixel between the reset and the time of measuring. The exposure time, then, may be the time between the reset of the pixels and the time at which the charge is measured. Cameras with different imaging technology, of course, may have exposures determined in different ways.

Some cameras may need to capture several frames before the properties of the image sensor or sensors settle. Accordingly, at action 230, the image processor may instruct the camera to capture a number of pre-processing frames to allow the image sensor or sensors of the camera to settle. Once captured, pre-processing frames may be stored and/or discarded. The number of pre-processing frames may depend on the image sensor or sensors being used and/or on the frame rate. In some examples, ten (10) pre-processing frames may be captured. In examples where the image sensor or sensors of the camera do not need to settle, action 230 may be omitted. At action 232, the image processor may set the exposure of the camera. In some examples, the image processor may set the exposure to a maximum acceptable over-exposure. For example, the image processor may set the exposure to the maximum exposure allowed by the camera. In some examples, the image processor may set the exposure of the camera to a predetermined number of units above the standard exposure for the current lighting conditions. For example, the image processor may be configured to analyze the pre-processing frames to determine an optimum exposure level for ordinary image capture. The image processor may add the predetermined number of units to the optimum exposure and apply the sum to the camera. Although actions 230 and 232 are described as part of an initial configuration of the camera, in some examples, the image processor may be configured to periodically repeat actions 230 and 232 during motion detection to optimize the exposure of the camera for changing lighting conditions. For example, actions 230 and 232 may be repeated every twenty (20) minutes, every hour, etc.

Figure 6:
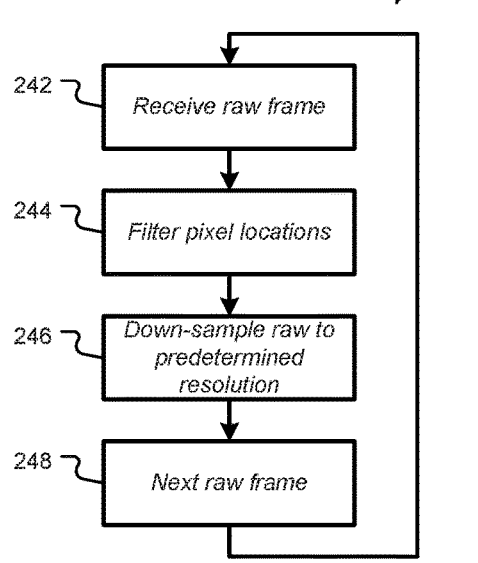
FIG. 6 is a flow chart showing one example of a process flow that may be executed by an image processor to pre-process raw frames received from a camera.

FIG. 6 is a flow chart showing one example of a process flow 240 that may be executed by an image processor to pre-process raw frames received from a camera. For example, the process flow 240 is one example way that the image processor may perform the pre-processing of action 204 of the process flow 200. At action 242, the image processor may receive a raw frame. The raw frame may be received directly from a camera and/or from a data storage medium where it has been previously stored. The raw frame may comprise a set of raw pixel values for a set of raw pixel locations. At action 244, the image processor may optionally filter the raw pixel values. For example, the image processor may apply a smoothing algorithm or other suitable filter to modify isolated raw pixel values that do not match raw pixel values for adjacent raw pixel locations. Although filtering at action 244 is illustrated before down-sampling at action 246, in some examples, filtering may occur after down-sampling instead of or in addition to filtering before down-sampling.

At action 246, the image processor may downsample the raw image to a predetermined resolution. The predetermined resolution may be selected for motion detection. Any suitable resolution may be selected. In some examples, the resolution may be between forty (40) and 120 pixels. In some examples, the resolution may be sixty (60) pixels in width. In some examples, the resolution may be tuned to the field-of-view of the camera. For example, a camera placed outdoors with a large field of view may utilize a higher resolution. Down-sampling the raw frame may be performed in any suitable manner. For example, the image processor may group the raw pixel values of the raw frame according to their raw pixel locations. Pixel values with adjacent raw pixel locations may be in a common group. The size of the groups may depend on the resolution of the raw frame and the down-sampled resolution that the raw frame is to have after down-sampling. In some examples, groups of pixel values may be square (e.g., two-by-two, three-by-three, four-by-four, etc.), rectangular, round, etc. In some examples, Gaussian down-sampling may be used. When groups are determined, the pixel values in each group may be aggregated. Any suitable aggregation may be used. In some examples, the pixel values may be averaged. In some examples, a median pixel value from among the pixel values in the group may be selected. In some examples, a highest or lowest pixel value from among the pixel values in the group may be selected.

In some examples, pixel values may have a single quantity. For example, greyscale pixel values may have a single quantity. Aggregating greyscale pixel values in a group may comprise aggregating the single value. In other examples, pixel values may have multiple quantities. For example, Red/Green/Blue (RGB) pixel values may have a red quantity, a green quantity, and a blue quantity. YUV pixel values may have one color or luma quantity (Y') and two brightness or chrominance components (U and V). Multi-quantity pixel values may be aggregated in any suitable manner. In some examples, the image processor may average each quantity. For example, if four RGB pixel values were aggregated, the image processor may find an average of the four red quantities, an average of the four green quantities, and an average of the four blue quantities. Also, in some examples, the image processor may find a median for each quantity. For example, if nine YUV pixel values are aggregated, the image processor may find an median Y quantity, a median U quantity, and a median V quantity. At action 248, the image processor may move to the next frame and return to action 242. In some examples, the process flow 240 may be omitted. For example, if the raw image received from the camera is of an acceptable resolution, then down-scaling may not be performed.

Figure 7:
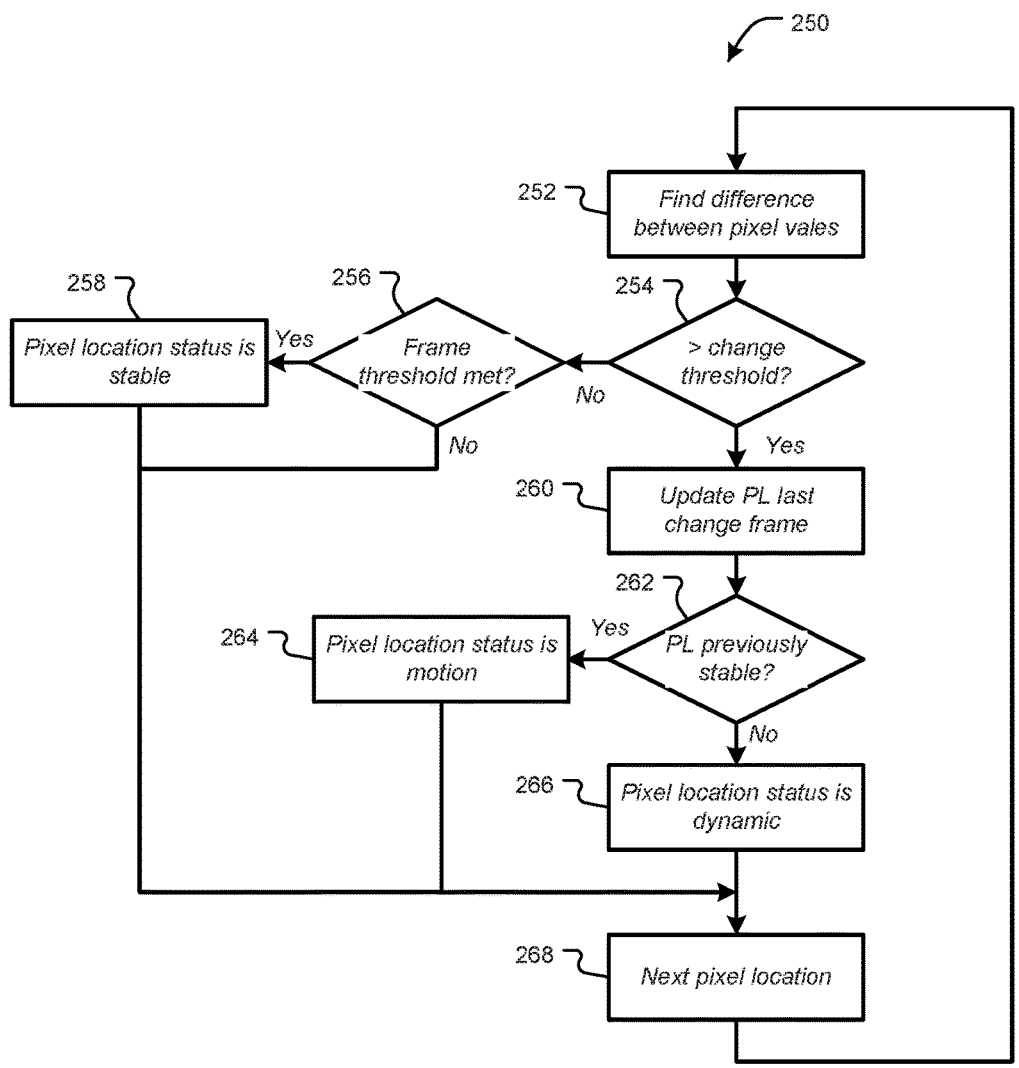
FIG. 7 is a flow chart showing one example of a process flow for classifying pixel locations in a frame.

FIG. 7 is a flow chart showing one example of a process flow 250 for classifying pixel locations in a considered frame. The process flow 250 shows one example way that the image processor may determine pixel location statuses at action 210 of the process flow 200. At action 252, the image processor may find a difference between the pixel value for a first pixel location at the considered frame and the pixel value for the first pixel location at the previous frame. For example, referring to FIG. 1, if the frame 12a is the considered frame, the image processor may find the difference between the pixel value for the first pixel location at the frame 12a the pixel value for the first pixel location at the previous frame (e.g., frame 12a-1).

The difference between two pixel values may be determined in any suitable manner. If the two pixel values are single quantity pixel values, such as greyscale pixel values, the difference between the pixel values may be the difference between the quantities. For example, the difference between a first greyscale pixel value of 150 and a second greyscale pixel values of 175 may be 25. For multi-quantity pixel values, other manners of determining the difference between pixel values may be used. In some examples, the difference between pixel values may be found by finding a Euclidian distance between the pixel values. For example, a difference between a first RGB pixel value (x) having quantities Rx, Gx, and Bx and a second RGB pixel value (y) having quantities Ry, Gy, and By may be given by Equation [1] below:

$$\text{Difference} = \sqrt{(Rx-Ry)^2 + (Gx-Gy)^2 + (Bx-By)^2} \quad [1]$$

Although the Euclidian distance example of Equation [1] uses RGB pixel values, the Euclidian distance technique may be used for any multi-quantity pixel value. In some examples, the difference between multi-quantity pixel values may be found by taking the absolute difference between the pixel values. For example, the absolute difference between a first YUV pixel value (a) having quantities Ya, Ua, and Va and a second YUV pixel value (b) having quantities Yb, Ub, and Vb may be given by Equation [2] below:

$$\text{Difference} = |Ya-Yb| + |Ua-Ub| + |Va-Vb| \quad [2]$$

Although the absolute difference example of Equation [2] uses YUV pixel values, the absolute distance technique may be used with any multi-quantity pixel value. Also, any other suitable method of determining the difference between pixel values may be used.

At action 254, the image processor may determine if the difference between the pixel value for the first pixel location at the considered frame indicates that the pixel value for the pixel location has changed between the previous frame and the considered frame. In some examples, the difference may indicate a change if it exceeds a change threshold. The change threshold may be selected in any suitable manner. In some examples, a different change threshold may be applied to different portions of the considered frame. For example, the image processor may receive feedback information indicating when detected motion is a false positive (e.g., the image processor detects motion even when no motion is present). If more than a threshold number of false positives are detected at a portion of the frame (e.g., a set of pixel locations), then the image processor may increase the change threshold for those pixel locations. Similarly, if more than a threshold number of missed motion events are detected at a set of pixel If the difference is greater than the change threshold at action 254, then the pixel values for the pixel location may be considered to have changed between the considered frame and the previous frame. The image processor may update a last change indicator for the pixel location at action 260 to indicate that the pixel location has changed at the considered frame. The last change indicator may take any suitable form. In some examples, the last change indicator may be a counter that is incremented at each frame where the pixel value for the pixel location is unchanged relative to the previous frame. Updating the indicator may comprise clearing the counter. Also, in some examples, the last change indicator may be a indication of the prior frame where the pixel value for the pixel location changes. Accordingly, updating the indicator may comprise writing to the indicator data describing the considered frame such as, for example, a frame number.

Referring again to action 254, in some examples, each considered frame may be compared to the frame immediately before it according to the frame sequence. For example, using FIG. 1 as an example, pixel values of frame 12a may be compared to pixel values at frame 12a-1. Pixel values at 12a-1 may be compared to pixel values at 12a-2 and so on. In various examples, this may allow the pixel values to drift over time without causing false positive motion detection. For example, if the lighting conditions in the field-of-view 8 change between frame 12a-n and frame 12a, then the difference in the pixel value for the pixel location 20 at frame 12a may differ from the pixel value for the pixel location 20 at frame 12a-n. If the change in lighting conditions or other change is gradual, however, the change in value of the pixel location 20 between frame 12a and frame 12a-1 may not be greater than the change threshold, causing the image processor to correctly classify pixel location 20 as a static pixel location at frame 12a.

If the difference at action 254 is not greater than the frame threshold, then the image processor may determine, at action 256, whether the pixel value for the considered pixel location has changed in during a frame threshold number of frames prior to the considered frame. For example, the image processor may refer to the last change indicator. If the last change indicator indicates that the last change in pixel value at the pixel location occurred more than the threshold number of frames prior to the considered frame, then the image processor may, at action 258, store an indication that the pixel value status is stable. From action 258, the image processor may proceed to the next pixel location at action 268 and return to action 252 considering the next pixel location. If the last change indicator indicates that the last change in the pixel value at the pixel location did occur within the threshold number of frames at action 256, the image processor may store an indication that the pixel location is dynamic. In some examples, because the pixel location has changed within the frame threshold number of frames, it may have been previously marked as dynamic so it may not be necessary for the image processor to modify its status. The image processor may proceed to the next pixel location at action 268 and return to action 252 considering the next pixel location.

Referring back to 260 and the instance where the pixel value for the pixel location has changed at the considered frame, at action 262, the image processor may determine whether the pixel location was previously stable. The pixel location may have previously been stable if it had not changed for more than the frame threshold of frames prior to the previous frame. If the pixel location had been previously stable, then the image processor may store an indication that the pixel location is a motion pixel location at action 264 and may proceed to action 268. If the pixel location was not previously stable, then the image processor may store an indication that the pixel location is static at action 266 and proceed to action 268. In some examples, the image processor may execute the process flow 250 until all pixel locations are processed at the considered frame. In some examples, at the conclusion of the process flow 250, the image processor may have a stored indication of each pixel location that is a motion pixel location at the considered frame. In some examples, at the conclusion of the process flow 250, the image processor may have a stored indication of each pixel location that is static. In some examples, at the conclusion of the process flow 250, the image processor may have a stored indication of the status of each pixel location.

Figure 8:
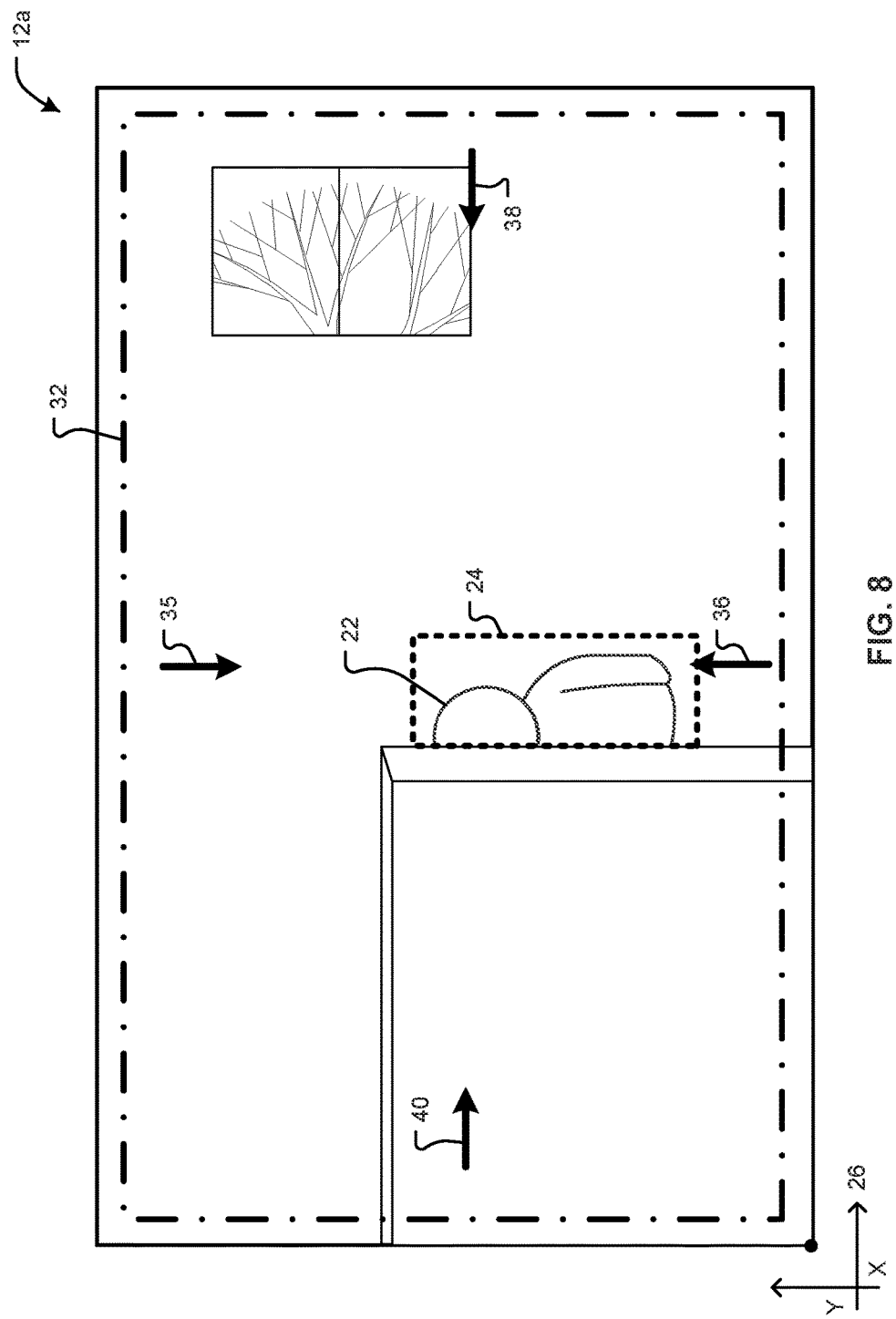
FIG. 8 is a diagram showing one example of the frame of FIG. 1 illustrating the bounding box and a working bounding box.
Figure 9:
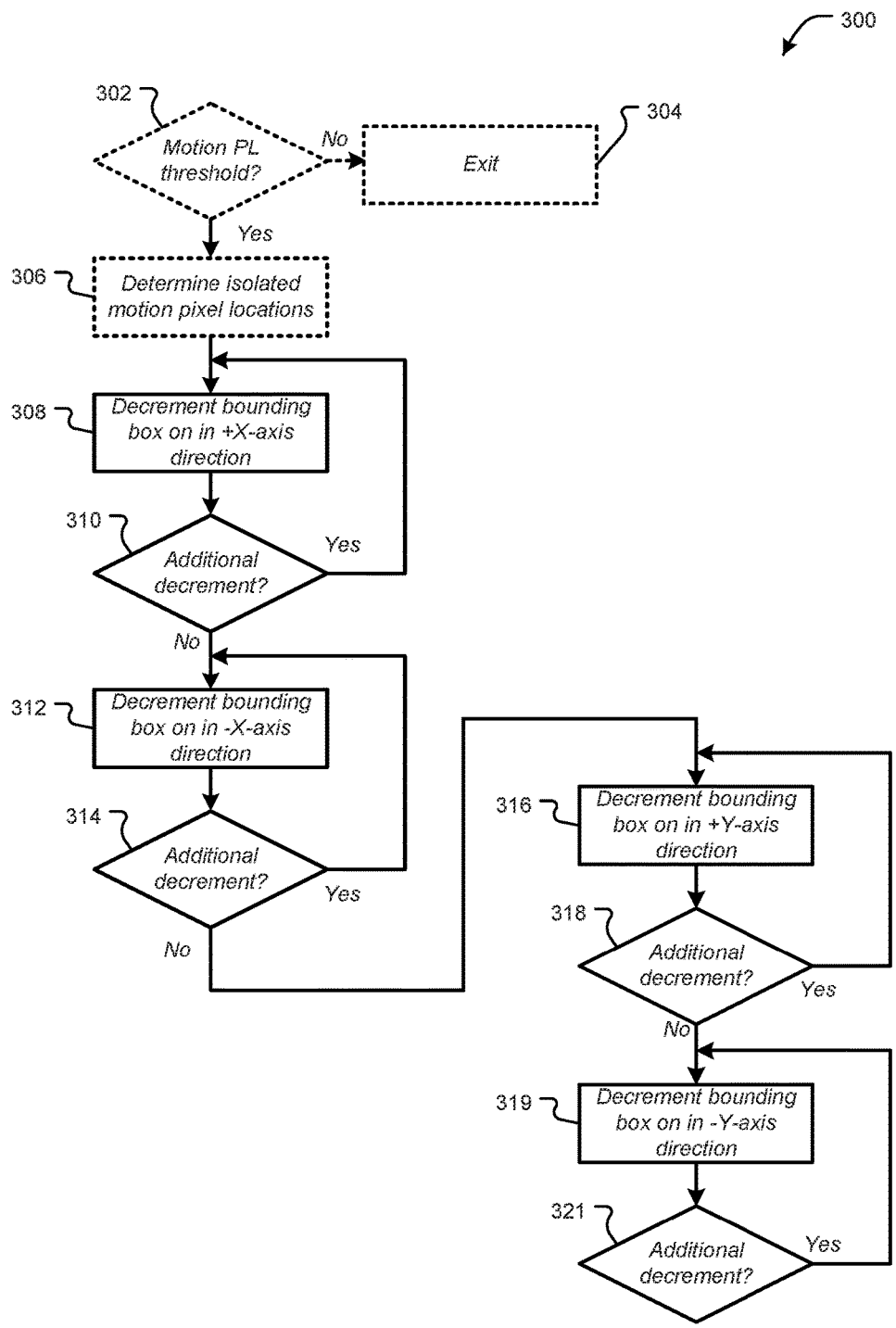
FIG. 9 is a flow chart showing one example of a process flow that may be executed by the image processor to generate a bounding box.

As described herein, in some examples, the image processor may generate a bounding box containing some or all of the motion pixel locations at a considered frame. FIGS. 8 and 9 illustrate an example technique for generating a bounding box. FIG. 8 is a diagram showing one example of the frame 12a of FIG. 1 illustrating the bounding box 22 and a working bounding box 32. FIG. 9 is a flow chart showing one example of a process flow 300 that may be executed by the image processor to generate a bounding box. At action 302, the image processor may optionally determine whether the motion pixel location threshold number of pixel locations in the considered frame are motion pixel locations (e.g., as determined using the process flow 250). The motion pixel location threshold may be the minimum number of motion pixel locations that may be present for the image processor to detect motion in the considered frame. If the number of motion pixel locations in the frame is less than the motion pixel location threshold, then the image processor may exit at action 304. For example, if less than a motion pixel location threshold number of pixel locations are motion pixel locations at the considered frame, then the image processor may determine that there is no motion at the considered frame regardless of a bounding box and may, therefore, omit actions for determining a bounding box.

At action 306, the image processor may optionally determine isolated motion pixel locations in the considered frame. Isolated motion pixel locations may be motion pixel locations at the considered frame that are not near other motion pixel locations according to the spatial arrangement of the pixel locations. For example, isolated motion pixel locations may be likely to indicate noise rather than motion in the field-of-view of the camera. In some examples, the image processor may determine isolated motion pixel locations by finding motion pixel locations with fewer than a threshold number of motion pixel locations within a threshold distance. The threshold number of motion pixel locations may be any suitable number including, for example one (1). The threshold distance, in some examples, may be measured in pixel locations. For example, the distance between two pixel locations may be the Euclidian distance between the X-axis and Y-axis coordinates for the pixel locations. In some examples, the image processor may determine isolated motion pixel locations by determining whether each motion pixel location can be placed in a boundary with a threshold number of other motion pixel locations. The boundary may be of any suitable size (e.g., five (5) pixel locations by five (5) pixel locations). The threshold number of other motion pixel locations may be any suitable number including, for example, one (1). Isolated motion pixel locations may be removed from further consideration in determining the bounding box. Removing isolated motion pixels from further consideration may filter noise appearing in the considered frame and reduce false positive detection of motion. In some examples, action 306 may be omitted, for example, when other spatial filtering is performed either by the camera or at another point in the processing of the frame.

Referring to FIG. 8, at the outside of the process flow 300, the image processor may begin with a working bounding box 32 positioned at the perimeter of the considered frame (in this example, frame 12a). At action 308, the image processor may decrement the border of the bounding box 32 in the positive X-axis direction (e.g., the direction of the arrow 40). At action 310, the image processor may determine if the bounding box can be further decremented in the positive X-axis direction without excluding one or more motion pixel locations from the bounding box. If so, the image processor may return to action 308 and decrement the bounding box on the positive X-axis direction again.

If the bounding box cannot be further decremented in the positive X-axis direction, then the image processor may proceed to action 312 and decrement the bounding box in the negative X-axis direction (e.g., the direction of the arrow 38). At action 314, the image processor may determine if the bounding box can be further decremented in the negative X-axis direction without excluding one or more motion pixel locations from the bounding box. If so, the image processor may return to action 312 and again decrement the bounding box on the negative X-axis direction. If the bounding box cannot be further decremented on the negative X-axis direction, then the image processor may proceed to action 316 and decrement the bounding box in the positive Y-axis direction (e.g., the direction of arrow 36). At action 318, the image processor may determine if the bounding box can be further decremented in the positive Y-axis direction without excluding one or more motion pixel locations from the bounding box. If so, the image processor may return to action 316 and decrement the bounding box in the positive Y-axis direction again.

If the bounding box cannot be further decremented in the positive Y-axis direction, the image processor may proceed to action 319 and decrement the bounding box in the negative Y-axis direction (e.g., the direction of the arrow 35). At action 321, the image processor may determine if the bounding box can be further decremented in the negative Y-axis direction without excluding one or more motion pixel locations from the bounding box. If so, the image processor may return to action 319 and decrement the bounding box in the negative Y-axis direction again. If not, then the bounding box may be the smallest bounding box that includes all of the motion pixel locations. It will be appreciated that FIG. 9 illustrates just one example method for finding a bounding box. Any suitable method could be used. For example, the order of the considered directions in the process flow 300 of FIG. 9 may be modified in any suitable manner. Also, in some examples, when the positions of motion pixel locations are known, the image processor may find the four sides of the bounding box by determining the highest and lowest X-axis and Y-axis coordinates for motion pixel locations. The highest and lowest X-axis and Y-axis coordinates for motion pixel locations may be X-axis and Y-axis positions of the four sides of the bounding box.

Figure 10:
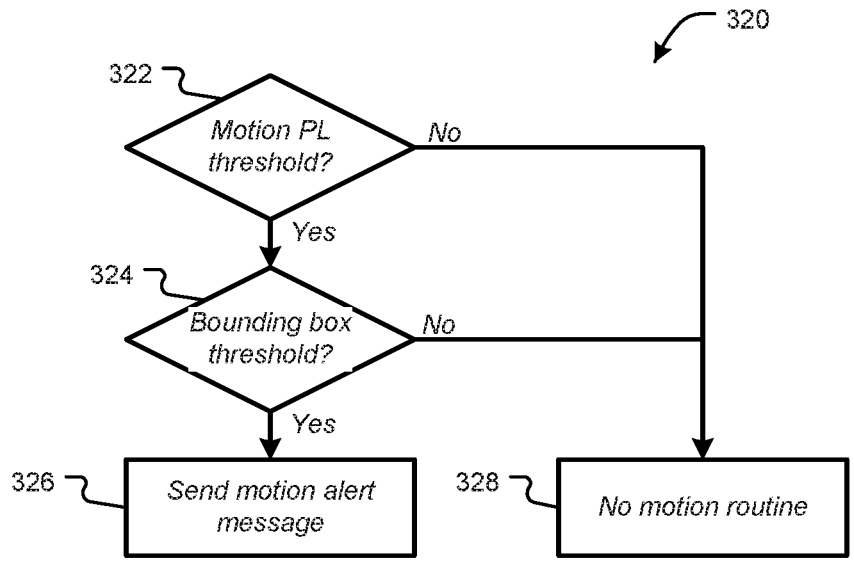
FIG. 10 is a flow chart showing one example of a process flow that may be executed by the image processor to detect motion in a considered frame.

FIG. 10 is a flow chart showing one example of a process flow 320 that may be executed by the image processor to detect motion in a considered frame. For example, the process flow 320 may be executed by the image processor to evaluate action 210 of the process flow 200. At action 322, the image processor may determine if the number of motion pixel locations at the considered frame exceeds a motion pixel location threshold. If not the image processor may, at action 328, determine that there is no motion at the considered frame. Any suitable motion pixel location threshold may be used. In some examples, the motion pixel location threshold may be at least two (2) so as to allow a bounding box to be formed.

If the number of motion pixel locations does exceed the motion pixel location threshold, the image processor may, at action 324, determine whether a bounding box including the motion pixel locations (or the non-isolated motion pixel location thresholds in some examples) meets a bounding box threshold. The bounding box threshold may be met in some examples, if a perimeter of the bounding box exceeds a perimeter threshold. In some examples, the bounding box threshold may be met if an area of the bounding box exceeds an area threshold. If the bounding box threshold is met, the image processor may send a motion message, as described herein, at action 326. If the bounding box threshold is not met, then the image processor may determine, at action 328, that there is no motion at the considered frame. In some examples, action 324 may be omitted. For example, if the number of motion pixel locations exceeds the motion pixel location threshold, the image processor may send the motion message at action 326.

Figure 11:
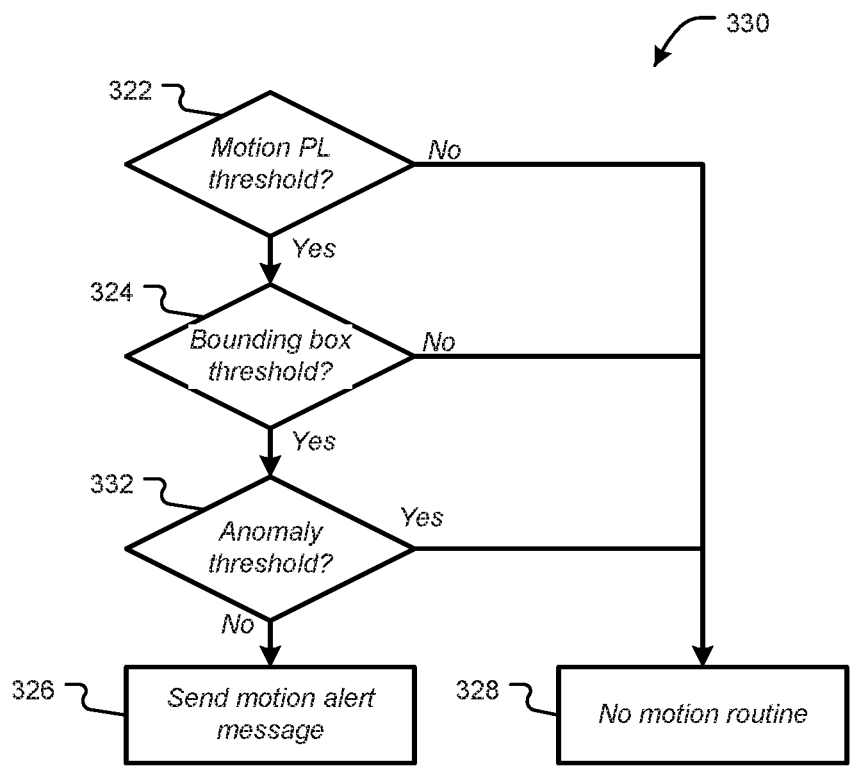
FIG. 11 is a flow chart showing one example of a process flow that may be executed by the image processor to detect motion in a considered frame.

FIG. 11 is a flow chart showing one example of a process flow 330 that may be executed by the image processor to detect motion in a considered frame. The process flow 330 may be similar to the process flow 320, but may include an action 332 where the image processor determines whether one or more anomaly thresholds are met. An anomaly threshold may be met for a considered frame if the image processor is determines that an anomaly has occurred that may tend to cause a false detection of motion. If an anomaly threshold is met, the image processor may determine at action 328 that no motion is depicted at the considered frame.

Various types of anomalies may be analyzed at action 332. For example, if a light is turned on in the field-of-view of the camera, it may result in a large number of motion pixel locations regardless of whether there is motion (e.g., a lighting anomaly). Accordingly, one type of anomaly threshold may be a maximum number of motion pixel locations. If more than the maximum number of motion pixel locations exist at a considered frame, the image processor may not detect motion in the considered frame. Also, in some examples, a computing device may turn on a screen or other display device that creates light. The created light may cause the number of motion pixel locations in a considered frame to exceed the motion pixel threshold. Accordingly, another example type of anomaly threshold may involve measuring a time between a display illumination and the capture of the considered frame. If the time is less than a threshold, then the image processor may not detect motion at the considered frame.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flow charts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flow charts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of detecting motion in a video, comprising:
    receiving, from a camera, a plurality of raw frames, including a first raw frame associated with a first time stamp and a second raw frame associated with a second time stamp;
    determining an order of the first raw frame and the second raw frame to be in a frame sequence such that the first raw frame is before the second raw frame because the first time stamp is associated with a first time that is before a second time associated with the second time stamp;
    generating, from the plurality of raw frames, video data comprising a plurality of frames ordered according to the frame sequence, wherein generating the video data comprises:
        generating a first frame comprising a first plurality of pixel values for a plurality of common pixel locations on a two-dimensional grid comprising an X-axis and a Y-axis; and
        generating a second frame positioned immediately after the first frame in the frame sequence and comprising a second plurality of pixel values for the plurality of common pixel locations;
    identifying from the plurality of common pixel locations a plurality of stable pixel locations that are associated with pixel values that have not changed by more than a change threshold for at least a frame threshold number of frames in the frame sequence prior to the first frame;
    identifying from the plurality of stable pixel locations a plurality of motion pixel locations that are associated with pixel values that have not changed by more than the change threshold for the frame threshold number of frames in the frame sequence prior to the first frame and with pixel values that did change by more than the change threshold between the first frame and the second frame;
    generating a bounding box that encloses at least a portion of the plurality of motion pixel locations;
    determining that a perimeter of the bounding box is greater than a perimeter threshold;
    determining that a number of motion pixel locations in the plurality of motion pixel locations exceeds a motion pixel threshold; and
    in response to at least one of determining that the perimeter of the bounding box is greater than the perimeter threshold and the determining that the number of motion pixel locations in the plurality of motion pixel locations exceeds the motion pixel threshold, sending a motion message indicating that motion is detected in the second frame.

2. The method of claim 1, wherein generating the video data comprises:
    downscaling the first raw frame from the plurality of raw frames to generate the first frame, wherein the first raw frame comprises a first plurality of raw pixel values and first spatial data describing spatial positions of the first plurality of raw pixel values on the two-dimensional grid, and wherein the downscaling of the first raw frame comprises:
        selecting a set of raw pixel values from the first raw frame, wherein the set of raw pixel values are at a first pixel location of the plurality of common pixel locations; and
        determining a first average of the set of raw pixel values to generate a first pixel value associated with the first pixel location at the first frame; and
    downscaling the second raw frame from the plurality of raw frames to generate the second frame, wherein the second raw frame comprises a second plurality of raw pixel values and second spatial data describing spatial positions of the second plurality of raw pixel values on the two-dimensional grid, and wherein the downscaling of the second raw frame comprises:
        selecting a second set of raw pixel values from the second raw frame, wherein the second set of raw pixel values are at the first pixel location of the plurality of common pixel locations; and
        determining a second average of the second set of raw pixel values to generate a second pixel value associated with the first pixel location at the first frame.

3. The method of claim 1, further comprising, before sending the motion message, determining that the motion detected in the second frame is not due to a lighting anomaly by determining that the number of motion pixel locations in the plurality of motion pixel locations is less than an anomaly threshold.

4. A system comprising:
    at least one processor; and
    at least one non-transitory data storage device in communication with the at least one processor, wherein the at least one non-transitory data storage device comprises instructions that, when executed by the at least one processor, cause the at least one processor to:
        receive video data representing a first frame and a second frame of a plurality of frames;
        determine that the first frame comprises a first plurality of pixel values;

determine that the second frame comprises a second plurality of pixel values, wherein the second frame is positioned after the first frame in a frame sequence;

determine that a first subset of pixel locations have pixel values that differ by less than a threshold amount between frames for at least a threshold number of frames in the frame sequence prior to the first frame;

identify, from the first subset of pixel locations, a second subset of pixel locations that differ by more than the threshold amount between the first frame and the second frame;

determine that a number of pixel locations in the second subset of pixel locations is greater than a motion pixel threshold; and send a motion message indicating that motion is detected in the second frame based at least in part on the number of pixel locations in the second subset of pixel locations being greater than the motion pixel threshold.

5. The system of claim 4, wherein the non-transitory data storage device comprises instructions that, when executed by the at least one processor, cause the at least one processor to:

identify a bounding box that includes the second subset of pixel locations; and determine that a property of the bounding box is greater than a threshold perimeter.

6. The system of claim 4, wherein the first plurality of pixel values comprises a first pixel value for a first pixel location and the second plurality of pixel values comprises a second pixel value for the first pixel location, wherein a change between the first pixel value and the second pixel value is greater than the threshold amount, and wherein the first pixel value comprises a first greyscale value and the second pixel value comprises a second greyscale value, and wherein the change between the second pixel value and the first pixel value is a difference between the first greyscale value and the second greyscale value.

7. The system of claim 4, wherein the first plurality of pixel values comprises a first pixel value for a first pixel location and the second plurality of pixel values comprises a second pixel value for the first pixel location, wherein the first and second pixel values are multi-quantity pixel values, wherein a change between the first pixel value and the second pixel value is greater than the threshold amount, and wherein the change between the second pixel value and the first pixel value is a Euclidian distance between the first pixel value and the second pixel value.

8. The system of claim 4, wherein the first plurality of pixel values comprises a first pixel value for a first pixel location and the second plurality of pixel values comprises a second pixel value for the first pixel location, wherein a change between the first pixel value and the second pixel value is greater than the threshold amount, wherein the first pixel value comprises a first brightness value and a first color value, wherein the second pixel value comprises a second brightness value and a second color value, and wherein the change between the second pixel value and the first pixel value is based at least in part on a sum of, a first absolute difference between the first brightness value and the second brightness value, and a second absolute difference between the first color value and the second color value.

9. The system of claim 4, further comprising a camera, wherein the plurality of frames are captured by the camera, and wherein the non-transitory data storage device comprises instructions that, when executed by the at least one processor, cause the at least one processor to:

send to the camera a first instruction to disable an auto white balance function of the camera; and send to the camera a second instruction to fix a focus of the camera.

10. The system of claim 4, wherein the non-transitory data storage device comprises instructions that, when executed by the at least one processor, cause the at least one processor to:

receive from a camera a set of pre-processing frames; and send to the camera a first instruction to increase an exposure setting of the camera, wherein the video data is received from the camera after the increase to the exposure setting.

11. The system of claim 4, wherein the non-transitory data storage device comprises instructions that, when executed by the at least one processor, cause the at least one processor to:

receive from a camera a first raw frame comprising a plurality of raw pixel values and spatial data describing spatial positions of the plurality of raw pixel values on a two-dimensional grid;

select a set of raw pixel values from the first raw frame, wherein the set of raw pixel values are at a first pixel location; and aggregate the set of raw pixel values to generate a first pixel value.

12. The system of claim 4, wherein the non-transitory data storage device comprises instructions that, when executed by the at least one processor, cause the at least one processor to, before sending the motion message, determine that the number of pixel locations in the second subset of pixel locations is less than an anomaly threshold.

13. A method comprising:

receiving video data representing a first frame and a second frame of a plurality of frames;

determining that the first frame comprises a first plurality of pixel values;

determining that the second frame comprises a second plurality of pixel values, wherein the second frame is positioned after the first frame in a frame sequence;

determining that a first subset of pixel locations have pixel values that differ by less than a threshold amount between frames for at least a threshold number of frames in the frame sequence prior to the first frame;

identifying, from the first subset of pixel locations, a second subset of pixel locations that differ by more than the threshold amount between the first frame and the second frame;

determining that a number of pixel locations in the second subset of pixel locations is greater than a motion pixel threshold; and sending a motion message indicating that motion is detected in the second frame based at least in part on the number of pixel locations in the second subset of pixel locations being greater than the motion pixel threshold.

14. The method of claim 13, further comprising:

identifying a bounding box that includes the second subset of pixel locations; and determining that a property of the bounding box is greater than a threshold perimeter.

15. The method of claim 13, wherein the first plurality of pixel values comprises a first pixel value for a first pixel location and the second plurality of pixel values comprises a second pixel value for the first pixel location, wherein a change between the first pixel value and the second pixel value is greater than the threshold amount, and wherein the first pixel value comprises a first greyscale value and the second pixel value comprises a second greyscale value, and wherein the change between the second pixel value and the first pixel value is a difference between the first greyscale value and the second greyscale value.

16. The method of claim 13, wherein the first plurality of pixel values comprises a first pixel value for a first pixel location and the second plurality of pixel values comprises a second pixel value for the first pixel location, wherein the first and second pixel values are multi-quantity pixel values, wherein a change between the first pixel value and the second pixel value is greater than the threshold amount, and wherein the change between the second pixel value and the first pixel value is a Euclidian distance between the first pixel value and the second pixel value.

17. The method of claim 13, wherein the first plurality of pixel values comprises a first pixel value for a first pixel location and the second plurality of pixel values comprises a second pixel value for the first pixel location, wherein a change between the first pixel value and the second pixel value is greater than the threshold amount, wherein the first pixel value comprises a first brightness value and a first color value, wherein the second pixel value comprises a second brightness value and a second color value, and wherein the change between the second pixel value and the first pixel value is based at least in part on a sum of, a first absolute difference between the first brightness value and the second brightness value, and a second absolute difference between the first color value and the second color value.

18. The method of claim 13, further comprising:
receiving from a camera a first raw frame comprising a plurality of raw pixel values and spatial data describing spatial positions of the plurality of raw pixel values on a two-dimensional grid;
selecting a set of raw pixel values from the first raw frame, wherein the set of raw pixel values are at a first pixel location; and
aggregating the set of raw pixel values to generate a first pixel value.

19. The method of claim 13, further comprising, before sending the motion message, determining that the number of pixel locations in the second subset of pixel locations is less than an anomaly threshold.

20. The method of claim 13, further comprising:
receiving from a camera a set of pre-processing frames; and
sending to the camera an instruction to increase an exposure setting of the camera, wherein the video data is received from the camera after the increase to the exposure setting.

* * * * *